United States Patent [19]

Nakamura

[11] Patent Number: 5,172,669
[45] Date of Patent: Dec. 22, 1992

[54] ENGINE CONTROL SYSTEM

[75] Inventor: Kazuhiro Nakamura, Hamamatsu, Japan

[73] Assignee: Sanshin Kogyo Kabushiki Kaisha, Hamamatsu, Japan

[21] Appl. No.: 822,183

[22] Filed: Jan. 16, 1992

[30] Foreign Application Priority Data

Feb. 5, 1991 [JP] Japan .................................. 3-35206

[51] Int. Cl.[5] ............................................... F02P 5/00
[52] U.S. Cl. ..................................... 123/416; 123/414
[58] Field of Search ............... 123/414, 416, 406, 417, 123/418; 364/431.04

[56] References Cited

U.S. PATENT DOCUMENTS

| 4,747,382 | 5/1988 | Suzuki et al. | 123/418 |
| 4,787,355 | 11/1988 | Maeda | 123/414 |
| 4,961,410 | 10/1990 | Matsumura et al. | 123/414 |
| 5,041,979 | 8/1991 | Hirka et al. | 364/431.04 |
| 5,054,447 | 10/1991 | Fukui et al. | 123/414 |
| 5,085,191 | 2/1992 | Okuda | 123/414 |
| 5,099,811 | 3/1992 | Frantz et al. | 123/416 |

Primary Examiner—Raymond A. Nelli
Attorney, Agent, or Firm—Ernest A. Beutler

[57] ABSTRACT

A method of timing an event in an internal combustion engine embodying sensors that sense a reference output shaft angle position and a series of incremental output shaft angle positions each sensed by a respective sensor. The timing of the event is chosen to follow an output signal of the incremental sensor and the time of delay between that and the timing of the event is adjusted by measuring the offset between the reference position sensor and the angular position sensor.

10 Claims, 2 Drawing Sheets

ENGINE CONTROL SYSTEM

BACKGROUND OF THE INVENTION

This invention relates to an engine control system and more particularly to an improved arrangement for controlling the timing of an electrically controlled event in an internal combustion engine.

A number of events in an internal combustion engine, particularly a spark ignited engine, are controlled to occur at a particular angular relationship of the engine output shaft. The angular output shaft position is important because it is related to the particular instantaneous volume of the combustion chamber wherein the event occurs. Such events may be either the timing of the firing of a spark plug, or the control of fuel injection, either the starting, ending or duration of such fuel injection.

Although the events should be timed in relation to engine output shaft angle, the existing methods for initiating the timing also use an actual or real time variant in addition to angular output shaft position. The reason for this is that it is very difficult and expensive to measure each incremental rotatable angle of the engine output shaft. Therefore, one of two basic methods have been employed for determining the timing of events in an engine.

The first method of determining the timing is to use a reference output shaft angle as a starting point for measuring the timing. The time for the engine output shaft to rotate from this reference angle position to a position at which the event is to occur is based upon the average rotational speed of the output shaft and the event is initiated at a time interval after the reference crank angle position passes determined by this average rotational speed. However, as is well known, the speed of rotation of the output shaft of an engine varies not only from revolution to revolution but during a single revolution. Therefore, the average speed calculation afore referred to does not provide an accurate indication of output shaft angle under all circumstances and represents at best an approximation.

Another method of timing the event is to employ a toothed wheel that is driven with the engine output shaft and a sensor that sends out pulses for each incremental rotation of the toothed wheel. This type of system can offer greater accuracy, however, has its own disadvantages. In the first instance, the sensitivity of the device will be dependent upon the number of teeth employed. However, if the number of teeth employed is increased to increase the accuracy, then not only the cost of the system become elevated, but extraneous noise becomes a problem. That is, complicated electrical circuities are required to discriminate between the passing of the teeth on the wheel and extraneous noise. Furthermore, the timing of the event does not always occur at an exact interval when a tooth will pass the sensor. Hence, it is still necessary to make some time calculation to determine incremental rotation between the output pulses of the teeth.

A system has been provided to improve the accuracy of such timing and is disclosed in the co-pending application entitled "Engine Control System", filed in the name of Hitoshi Motose and Akihiko Hoshiba, Ser. No. 07/822,175, filed Jan. 16, 1992, and assigned to the Assignee hereof. However, the system disclosed in that application is also dependent upon a toothed wheel and sensors that provide a reference shaft position as well as incremental shaft angular position.

In addition to the problems as aforenoted, when two sensors are employed there is a difficulty in insuring the accurate angular location of one sensor relative to the other. This problem is even further compounded when each sensor cooperates with a respective toothed wheel. The toothed wheels may have different angular positions relative to the output shaft. These misalignments between sensors and or toothed wheels can result in further inaccuracies, regardless of how sophisticated the control routine may be.

It is, therefore, a principal object to this invention to provide an improved arrangement for controlling the timing of an event of an internal combustion engine.

It is a further object to this invention to provide an improved arrangement for controlling the timing of the event of an engine that employs two sensors and which can compensate for misalignment between the sensors.

SUMMARY OF THE INVENTION

This invention is adapted to be embodied in a method of timing an event in an internal combustion engine having a rotating output shaft and wherein the event is to happen at a pre-determined angular position of the output shaft. The engine has means for outputting a reference signal indicative of a reference position of the output shaft and a series of pulse signals indicative of incremental angular rotation of the output shaft. The method comprises the steps of measuring the incremental angular offset between the generation of the reference signal and the adjacent signal indicative of angular shaft position to determine an offset shaft angle amount. A selected one of the pulse signals preceding the timed event is then picked and the initiation of the event to be timed is determined at a pre-determined time after the generation of the selected pulse signal adjusted to reflect the incremental angular shaft offset.

DETAILED DESCRIPTION OF THE PREFERRED EMBODIMENT OF THE INVENTION

Figure 1:
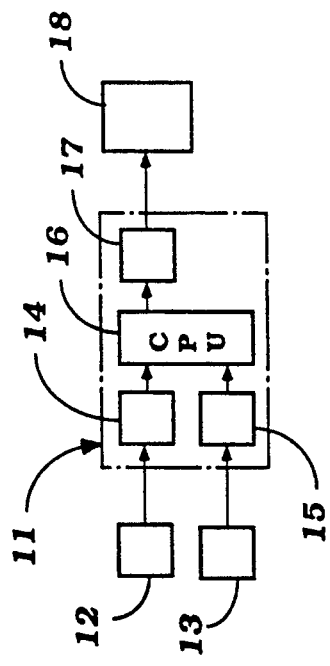
FIG. 1 is a schematic view showing the components of an event timing system constructed in accordance with an embodiment of the invention.

Referring first in detail to FIG. 1, a timing control arrangement for an internal combustion engine constructed and operated in accordance with an embodiment of the invention is shown schematically and is identified generally by the reference numeral 11. The timing device 11 includes a pair of sensors 12 and 13 which, in a preferred form of the invention, comprise pulser coils that cooperate with a respective toothed wheel or toothed wheels that are mounted for rotation with an output shaft of an associated internal combustion engine. These toothed wheels may be affixed for rotation directly with the engine output shaft or may be driven from the output shaft through some form of positive drive such as a gear train, chain drive or the like.

Figure 2:
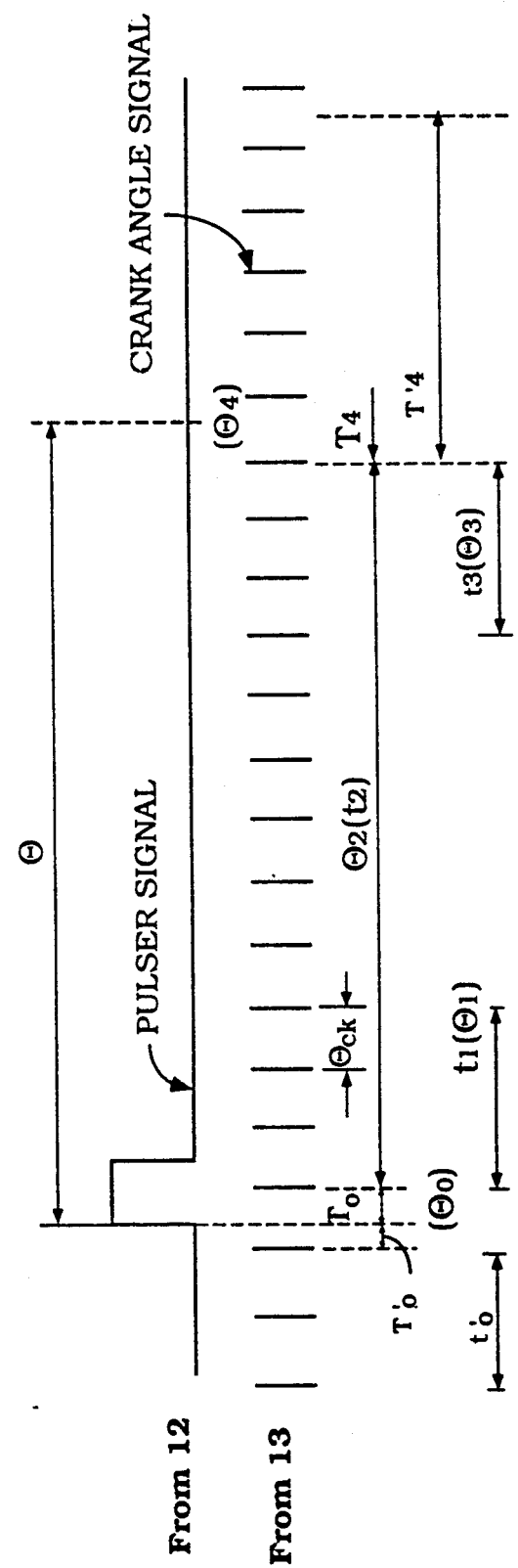
FIG. 2 is a view showing the pulse output signals of the device illustrated in FIG. 1.

The outputs from the sensor coils 12 and 13 are transmitted to respective input circuits 14 and 15 of the timing controller 11 which input circuits provide generally square wave pulses as best seen in FIG. 2. The sensor 12 gives a reference angle pulse from the input circuit 14 while the sensor 13 gives a series of square wave output pulses from the input circuit 15 depending upon the number of individual teeth on the associated wheel. It is assumed that, due to a variety of factors, the pulses from the sensors 12 and 13 can not be accurately made to coincide with each other.

The outputs from the input circuits 14 and 15 are transmitted to a CPU 16 which contains a series of pre-programmed maps indicative of the desired timing of the event relative to output shaft angular position dependent upon a number of engine operating and ambient parameters. These may be consists of such data as engine speed, ambient temperature, throttle position or load, etc. The CPU 16 operates on a control routine as will be later described in conjunction with FIG. 3.

The CPU 16 outputs a signal to a signal generator 17, which, in turn, outputs a signal to a controlled device 18 for initiating operation of the control device at the preselected output shaft angular position. The device 18 may, as in the illustrated embodiment, comprise a capacitor discharge ignition system of a known type wherein the output signal from the output 17 activates the state of a SCR to initiate spark plug firing, as is well known in this art. Alternatively, the device 18 may comprise a fuel injector, air/fuel injector or other device that is operated at a timed relationship to the engine output shaft angular position.

Figure 3:
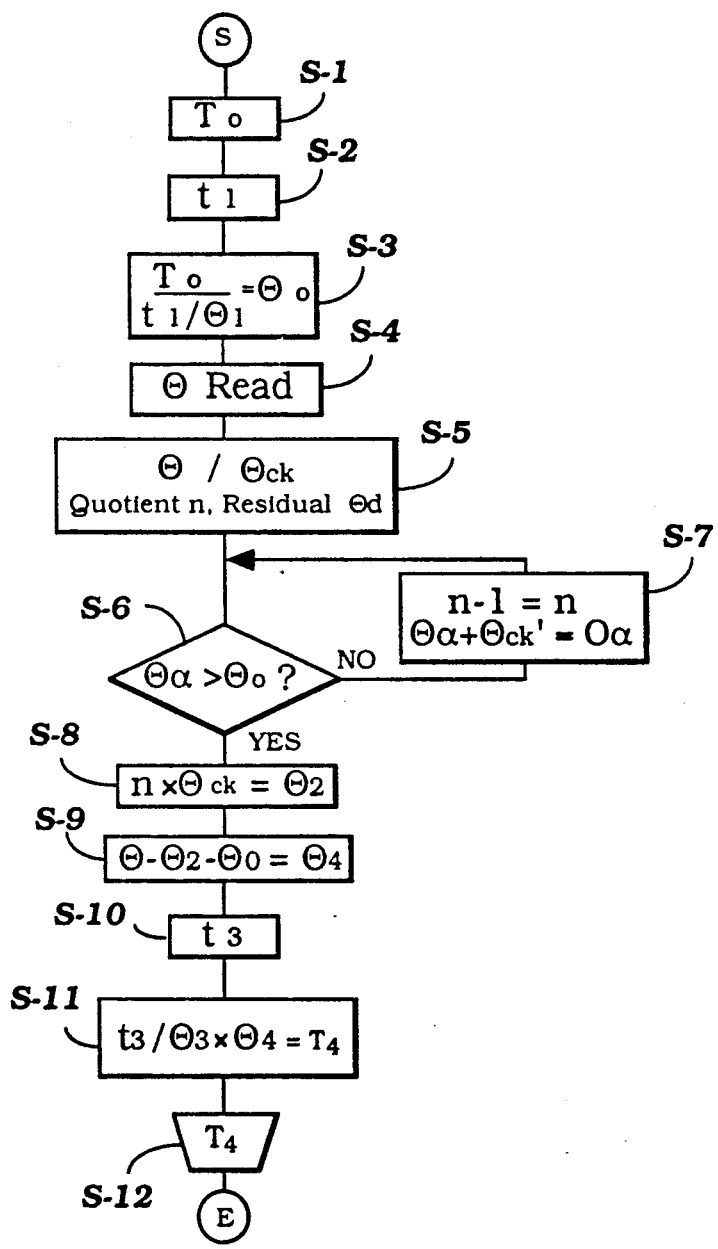
FIG. 3 is a block diagram showing the control routine.

Before proceeding to a description of the control routine by reference to the block diagram of FIG. 3, it is believed helpful to provide a general description of how the system operates. As may be seen from FIG. 2, the output signals from the sensors 12 and 13 are not exactly aligned with each other. An important advantage of this invention is that it is not necessary to insure that this signals are aligned. That is, some angular offset between the occurrence of the signals is acceptable.

The method operates by providing a measurement of the offset between the signals from the sensors 12 and 13 and then selecting an output signal from the sensor 13 which will occur immediately adjacent to the event to be timed, the spark firing in the illustrated embodiment. This selection is related to the angle $\theta$ which the event is to occur after the reference angular output shaft position from the sensor 12 is generated. The average rotational speed of the engine output shaft is then measured immediately prior to the output shaft reaching the position where the sensor 13 will output its signal from the selected tooth. A time is then computed after which this signal will occur which will correspond to the reference desired timing $\theta$ adjusted for by the offset between the pulses sent be the sensors 12 and 13.

The motive operation will not be discussed in detail by reference to FIG. 3. This description will involve reference to FIG. 2 to show the various timing and pulse signals related to the method.

First, at the step S-1 after starting, the program determines the time difference $T_0$ for the engine output shaft to rotate from the time when the reference signal pulse is given by the sensor 13 till the next output pulse is given from the sensor 13. The time $t_1$ is then determined for the crank engine output shaft to rotate through a definite crank angle range $\theta_1$ using the output value of the crank angular rotation sensor 13 near the timing of the reference crank angle position from the sensor 12. This time may be either a time after the next pulse from the sensor 13 is generated or at a time preceding the time when the reference angle position is determined from the sensor 12.

The program then moves to the step S-2 to determine the angular shaft offset between the signals from the sensors 12 and 13 at the step S-3. This is done by converting the time $T_0$ into an incremental angular shaft rotation $\theta_0$ determined by the angular rotational speed previously measured in accordance with the following equation:

$$\theta_0 = \frac{T_o}{t_1/\theta_1}$$

The program then moves to the step S-4 to determine the desired timing of the event $\theta$ from the pre-programmed map in the CPU 16 determined by the aforenoted sensed conditions of engine running and ambient. This timing occurs at a specific crank angular position $\theta_4$ measured from the reference angle signal.

The CPU 16 then selects an output pulse from the sensor 13 which will occur immediately prior to the angular position $\theta_4$ being reached. This is done to select an angular rotation $\theta_2$ between the first output pulse occurring at the time $T_0$ and angle $\theta_0$ after the initiation of the reference angle signal from the pulser 12, as previously determined. To perform this calculation, the CPU 16 first moves to the step S-5 so as to determine the number of pulse signals n which will be generated from the time to reach the angle $\theta$ in accordance with the standard spacing $\theta_{ck}$ of the individual pulse signals from the sensor 13. The calculation $\theta \div \theta_{ck}$ is then made to determine the number n.

In addition to determining the number n, the program at the step S-5 will result in a residual $\theta_d$ assuming that $\theta \div \theta_{ck}$ does not come out in a whole integer.

It must be remembered that the starting time for counting the pulses from the sensor 13 is determined at the point $T_0$ and angle $\theta_0$ after the initiation of the pulse from the reference sensor 12. As a result of this offset, it must be assured that the number n chosen will not result in the selected pulse occurring after the angle $\theta_4$. Therefore, there is made a determination at the step S-6 whether this condition occurs. This is done by measuring a different angle $\theta$ a which will be the angular rotation after the number of counted pulses have been generated until the angle $\theta_4$ is reached. If this difference angle $\theta_a$ is greater than zero than the program can proceed. If it can not, the program moves to the step S-7 so as to select a new number of pulses n which is one less than those previously selected. $n = n - 1$ Once the appropriate number of pulses n has been selected, the angle $\theta_2$ is then computed at the step S-8 by the equation:

$$n \times \theta_{ck} = \theta_2.$$

The program then moves to the step S-9 to determine the angular rotation $\theta_4$ from the selected pulse at which the timing will occur in accordance with the following equation:

$$\theta - \theta_2 - \theta_0 = \theta_4.$$

The program then moves to the step S-10 so as to calculate the time it takes the output shaft to rotate through a predetermined angle ($\theta_3$) such as 30° this time being the time $t_3$. The program then moves to the step S-11 so as to calculate the time $T_4$ required to reach the angular position $\theta_4$ after the selected pulse in accordance with the following equation:

$$\frac{t_3}{\theta_3} \cdot \theta_4 = T_4$$

The program them moves to the step S-12 so as to count the time $T_4$ and then initiate the event E at this time.

As has been noted, the choice of the signal from the crank shaft angle sensor 13 may be selected at a time $t'_0$ before the pulser signal 12 is generated. Also, it may be possible to measure the crankshaft speed by measuring the time $t'_1$ prior to the pulser signal rather than subsequent to it as with a previously described embodiment. In either event, however, the time $t'_1$ or $t_1$ should be selected close to the time at which the pulser signal is generated and close to the time when the adjacent pulse of the pulser coil 13 is generated.

Also, it has been chosen to select the pulse from the pulser coil 13 indicative of the crank angle position immediately prior to the desired timing. However, the timing can be selected at a still further advanced time as shown at $T'_4$ so long as this time is not so great as to seriously interfere with the accuracy.

Also, rather than using two different crankshaft angle speeds selected at the times $t_1$ and $t_3$ a single speed may be utilized such as a time $t_2$ as long as it is within the range of accuracy and the times are relatively close to each other.

Of course, the foregoing description is that of a preferred embodiment and preferred modifications of it. Various other changes and modifications may be made without departing from the spirit and scope of the invention, as defined by the appended claims.

I claim:

1. A method of timing an event in an internal combustion engine having a rotating output shaft and wherein the event is to happen at a pre-determined angular position of the output shaft, the engine having means for outputting a reference signal indicative of a reference position of the output shaft and a series of pulse signals indicative of incremental angular rotation of the output shaft, said method comprising the steps of measuring the incremental angular offset between the giving of the reference signal and an adjacent signal indicative of angular shaft position to determine an incremental angular offset amount, selecting one of the pulse signals proceeding the timed event, and initiating the event to be timed a pre-determined time after the generation of the selected pulse signal adjusted to reflect the incremental angular offset.

2. A method of timing an event in an internal combustion as set forth in claim 1 wherein the angular offset is measured by measuring the time elapsed between the generation of the angular reference signal and the adjacent pulse signal and computing the angular offset from an average speed of rotation of the output shaft.

3. A method of timing an event in an internal combustion engine as set forth in claim 2 wherein the average speed of the output shaft is measured in order to determine the angular offset.

4. A method of timing an event in an internal combustion engine as set forth in claim 3 wherein the angular speed of the output shaft is measured close to the time when the reference signal is generated.

5. A method of timing an event in an internal combustion engine as set forth in claim 1 wherein the selected pulse signal preceding the timed event is the pulse signal occurring immediately before the timed event.

6. A method of timing an event in an internal combustion engine as set forth in claim 5 wherein the event is initiated by computing the time the output shaft will take to reach the predetermined angular position by measuring the average speed of rotation of the output shaft and multiplying this by the computed time.

7. A method of timing an event in an internal combustion engine as set forth in claim 6 wherein the average speed of the output shaft is measured close to the time at which the event is to happen.

8. A method of timing an event in an internal combustion as set forth in claim 7 wherein the angular offset is measured by measuring the time elapsed between the generation of the angular reference signal and the adjacent pulse signal and computing the angular offset from an average speed of rotation of the output shaft.

9. A method of timing an event in an internal combustion engine as set forth in claim 8 wherein the average speed of the output shaft is measured in order to determine the angular offset.

10. A method of timing an event in an internal combustion engine as set forth in claim 9 wherein the angular speed of the output shaft is measured close to the time when the reference signal is generated.

* * * * *